(No Model.)

D. W. REESE.
CAR WHEEL.

No. 289,713. Patented Dec. 4, 1883.

WITNESSES
F. L. Ourand
E. G. Siggers

David W. Reese
INVENTOR
by C. A. Snow & Co
Attorneys

United States Patent Office.

DAVID WILLIAM REESE, OF CANAL DOVER, OHIO.

CAR-WHEEL.

SPECIFICATION forming part of Letters Patent No. 289,713, dated December 4, 1883.

Application filed October 2, 1883. (No model.)

*To all whom it may concern:*

Be it known that I, DAVID W. REESE, a citizen of the United States, residing at Canal Dover, in the county of Tuscarawas and State of Ohio, have invented a new and useful Car-Wheel, of which the following is a specification, reference being had to the accompanying drawings.

This invention relates to wheels for railroad-cars; and it has for its object to provide a wheel which shall be simple in its construction, inexpensive, and self-lubricating.

To this end it consists in certain improvements in the construction of the said wheel, which will be hereinafter fully described, and particularly pointed out in the claim.

Figure 1:
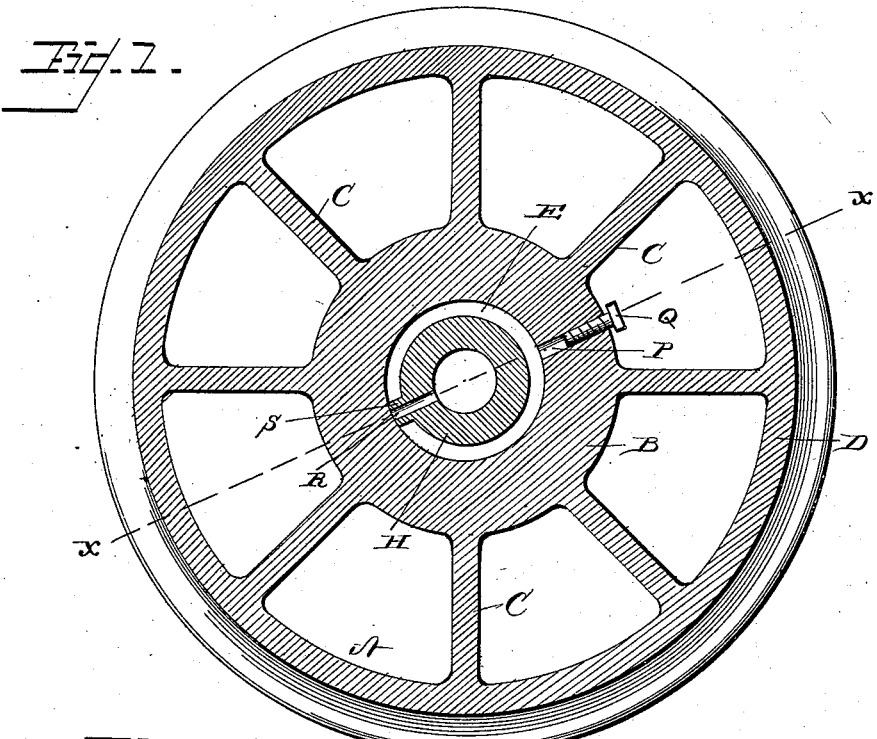
Figure 2:
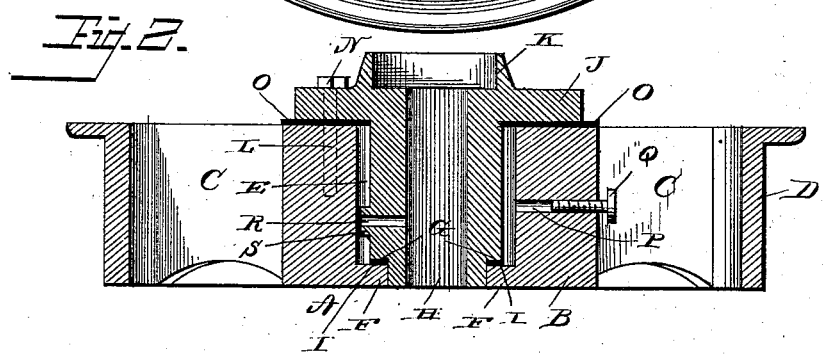
Figure 3:
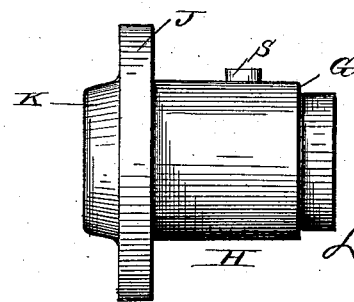

In the drawings hereto annexed, Figure 1 is a vertical sectional view of my improved car-wheel; Fig. 2 is a horizontal sectional view of the same on the line $x$ in Fig. 1, and Fig. 3 is a side view of the axle-box detached.

The same letters refer to the same parts in all the figures.

A in the drawings designates the body of the car-wheel, which consists of the hub B, spokes C, and the rim or tire D. The hub B is provided with an interior recess, E, the outer end of which has a flange, F, against which abuts a shoulder, G, formed upon the end of the axle-box H, packing I, of rubber or other suitable material, being interposed, so as to form a tight joint. The axle-box H is formed at its outer end with an annular flange, J, adapted to abut against the inner end of the hub; and it also has a circumferential inwardly-projecting flange, K, to receive the end of the axle or axle-clip. The axle-box is secured to the wheel by means of bolts L, passing through the flange J and nuts N. Packing O is interposed between the flange J and the body of the hub, in order to form a tight joint. The hub B has a radial opening, P, closed by a screw or plug, Q. Through this opening oil or lubricating material may be supplied to the wheel. This lubricating material accumulates in the recess E, surrounding the axle-box, and the latter is provided with an opening, R, surrounded by a flange or shoulder, S. It will thus be seen that when the wheel revolves, the oil, being thrown by centrifugal force against the outer walls of the recess E, will be compelled to enter the opening P, and thus be supplied to the spindle of the axle, which has its bearing in the axle-box.

From the foregoing description taken in connection with the drawings hereto annexed, the operation and advantages of my invention will be readily understood. It is simple, convenient, and effective.

I claim as my invention and desire to secure by Letters Patent of the United States—

The combination, with a car-wheel having hub B, provided with interior recess, E, flange F, radial opening P, and plug Q, of the axle-box H, having shoulder G, flange J, and a radial opening, R, surrounded by a flange or shoulder, S, and suitable connecting bolts and nuts, substantially as and for the purpose set forth.

In testimony that I claim the foregoing as my own I have hereto affixed my signature in presence of two witnesses.

DAVID WILLIAM REESE.

Witnesses:
SAMUEL TOOMEY,
JOHN SCHUMACHER.